United States Patent [19]

Durand et al.

[11] Patent Number: 4,857,611

[45] Date of Patent: Aug. 15, 1989

[54] GAS FLUIDIZED BED TERPOLYMERIZATION OF OLEFINS

[75] Inventors: Daniel C. Durand, Battersea, England; Frederic R. Morterol, Sausset-les-Pins, France

[73] Assignee: BP Chemicals Limited, London, England

[21] Appl. No.: 204,983

[22] PCT Filed: Apr. 30, 1985

[86] PCT No.: PCT/GB85/00184

§ 371 Date: Dec. 9, 1985

§ 102(e) Date: Dec. 9, 1985

[87] PCT Pub. No.: WO85/05111

PCT Pub. Date: Nov. 21, 1985

Related U.S. Application Data

[63] Continuation of Ser. No. 85,255, Aug. 11, 1987, abandoned, which is a continuation of Ser. No. 810,328, Dec. 9, 1985, abandoned.

[30] Foreign Application Priority Data

May 2, 1984 [FR] France .................................. 8406773

[51] Int. Cl.$^4$ ....................... C08F 2/34; C08F 210/16
[52] U.S. Cl. ..................................... 526/88; 526/125; 526/151; 526/348.2; 526/348.4; 526/348.5; 526/901; 526/904; 526/916
[58] Field of Search .............. 526/88, 125, 151, 348.2, 526/348.4, 348.5

[56] References Cited

U.S. PATENT DOCUMENTS

| | | | |
|---|---|---|---|
| 4,021,599 | 5/1977 | Kockhar et al. | 526/904 |
| 4,359,561 | 11/1982 | Fraser et al. | 526/88 |
| 4,438,243 | 3/1984 | Kashiwa et al. | 526/348.2 |
| 4,469,855 | 9/1984 | Cooper | 526/901 |
| 4,525,547 | 6/1985 | Kato et al. | 526/901 |
| 4,567,243 | 1/1986 | Pullukat et al. | 526/916 |
| 4,642,328 | 2/1987 | Morterol et al. | 526/88 |
| 4,721,763 | 1/1988 | Bailly et al. | 526/88 |

FOREIGN PATENT DOCUMENTS

| | | | |
|---|---|---|---|
| 99774 | 2/1984 | European Pat. Off. | |
| 2006232 | 5/1979 | United Kingdom | 526/904 |

OTHER PUBLICATIONS

Encyclopedia of Polymer Science and Technology, J. Wiley & Sons, New York, vol. 9, pp. 47, 48, 84, 118, 119, (1968).

Primary Examiner—Edward J. Smith
Attorney, Agent, or Firm—Brooks Haidt Haffner & Delahunty

[57] ABSTRACT

The present invention relates to a gas fluidized bed process for the production of copolymers having a density between 0.900 and 0.935, which process comprises copolymerization of (a) ethylene, (b) propylene and/or 1-butene, and (c) alpha-olefins comprising from 5 to 8 carbon atoms in the gaseous state, in admixture with an inert gas and optionally with hydrogen, in the presence of a catalytic system comprising a cocatalyst consisting of at least 1 organo-metallic compound of a metal of groups II and III of the Periodic Table of Elements and a special solid catalyst.

11 Claims, No Drawings

GAS FLUIDIZED BED TERPOLYMERIZATION OF OLEFINS

This application is a continuation of application Ser. No. 07/085,255, filed Aug. 11, 1987, which is a continuation of Ser. No. 06/810,328, filed Dec. 9, 1985, all now abandoned.

The present invention relates to a gas fluidised bed process for the production of copolymers of ethylene, propylene and/or 1-butene and alpha-olefins comprising from 5 to 8 carbon atoms, these copolymers having a density between 0.900 and 0.935 and having excellent mechanical and optical properties.

It is known that low-density polyethylene (LDPE), that is to say of a density less than 0.940, obtained according to a process for polymerizing ethylene by radical-forming catalysis under high pressure and at high temperature, possesses good optical properties such as good transparency for a slender thickness, but on the other hand has comparatively mediocre mechanical properties, especially as regards tearing strength, perforation and impact resistance, making it difficult to obtain finished objects with a very thin wall, such as film.

It is further known that copolymers of ethylene and propylene and/or 1-butene of the "linear low density polyethylene" type (LLDPE), with a density between 0.900 and 0.940, obtained by the copolymerisation of ethylene and alpha-olefins in the presence of a catalyst of the Ziegler-Natta type, generally possess mechanical properties which are superior to those of the LDPE's, but unfortunately they have mediocre optical properties.

It is known that LLDPE film prepared from a copolymer of ethylene and a higher alpha-olefin, comprising from 5 to 18 carbon atoms, such as 1hexene, 4-methyl-1-pentene or 1-octene has improved optical properties and especially, improved transparency. Such an LLDPE, furthermore, has the advantage of having tearing strength, perforation and impact resistances which are notably superior to those of the LLDPE's obtained by copolymerising ethylene, propylene and/or 1-butene.

It is also known that copolymers of ethylene, propylene and/or 1-butene and a higher alpha-olefin comprising 5 to 18 carbon atoms, with a density comprised between 0.900 and 0.940, not only have excellent optical properties when these copolymers are converted into film, but also mechanical properties which are as good as, if not better than those of the LLDPE's obtained by copolymerising ethylene and a higher alpha-olefin comprising from 5 to 18 carbon atoms.

These copolymers can be produced in solution in a solvent medium of a liquid hydrocarbon. The process of this type, according to which the copolymer is produced in the form of a solution in the liquid hydrocarbon medium, involves difficult operations for recovering the said copolymer from the solution. Moreover, a substantial part of the copolymer remains dissolved in the solvent, which renders the recovery and purification operations of the said solvent difficult.

It is also possible to produce in the gas phase copolymers of ethylene, propylene and/or 1-butene and a higher alpha-olefin comprising 5 to 12 carbon atoms, having a density comprised between 0.900 and 0.940. These copolymers are obtained by means of a copolymerisation reaction in the presence of a catalyst system comprising (a) a solid catalyst prepared generally by grinding magnesium chloride in the presence of titanium tetrachloride and possibly a halogenating agent or an electron donor agent, and (b) an organoaluminium compound as co-catalyst.

Catalysts prepared in this manner occur in the form of a powder consisting of particles with a broad particle size distribution. Hence such a catalyst cannot be used to carry out fluidised bed polymerisation reactions except as relatively low fluidisation speeds, for example of less than 3 times the minimum fluidisation speed, in order to avoid any substantial loss of particles from the fluidised bed by gas entrainment.

To satisfactorily remove the heat of reaction, it is then necessary to employ a system of mechanical agitation and/or a device for introduction, recovery and recycling of one or more readily volatile liquids. Accordingly, a solid catalyst of this type is not very suitable for use in a gas-phase fluidised-bed copolymerisation reactor because of its structure and composition. In point of fact a solid catalyst of this kind, prepared in the absence of reducing agent, comprises a tetravalent titanium salt, deposited on the surface of the magnesium chloride support in a relatively small quantity, such that the atomic ratio of the quantity of magnesium to the quantity of titanium is equal or superior to 10. The result is that as soon as this solid catalyst is introduced into the fluidised bed reactor, the copolymerisation reaction starts up very abruptly, creating on the one hand localised runaway reactions in the fluidised bed, and on the other hand the bursting of the solid particles of catalyst, the particle size of which is then no longer controlled. These localised runaway effects in the reaction produce hot spots and generally lead to the formation of agglomerates and reactor fouling.

Producing copolymers such as those described above in the gas phase, in the presence of a catalyst system comprising in particular a catalyst associated with an inorganic granular support is also known. This inorganic granular support generally consists of refractory oxides such as alumina or silica. The catalyst comprising a mixture of magnesium chloride and titanium tetrachloride, previously dissolved in a solvent of the electron donor compound type such as tetrahydrofuran, is deposited or precipitated on this granular support, which confers on the said catalyst specific and interesting properties for the technique of fluidised bed copolymerisation connected in particular with the particle size and resistance to abrasion of the catalyst.

But it is likewise known that the dispersion of a catalyst on a granular support of this type is accompanied by a growth in the catalytic activity, especially at the start-up of the copolymerisation reaction, this phenomenon also being amplified by the presence in the polymerisation medium of comonomers, such as for example 1-butene or 1-hexene. The result is localised reaction runaways, and also phenomena of bursting of the catalyst particles, so that copolymer obtained occurs in the form of a powder consisting of particles having forms reminiscent of "orange peel" and consequently this powder has a relatively low bulk density. This drawback may be partially avoided by dispersing the catalyst on a sufficiently large quantity of support. Unfortunately the copolymers obtained in this way have comparatively high contents of inorganic residues, which is harmful to the properties.

Another drawback of using catalysts of this type in gas-phase copolymerisation, especially in a fluidised bed, is bound up with the fact that of necessity they contain considerable quantities of an electron donor agent which may induce "secondary" copolymerisation reactions, particularly in the presence of heavy comonomers such as 1-hexene, 4-methyl-1-pentene and 1-octene, leading to the formation of oligomers and/or copolymers with a low molecular weight and/or a high content of comomoners, of a very sticky nature favouring the formation of agglomerates which are prejudicial to the proper operation of a fluidised bed reactor.

A process has now been found which makes it possible to avoid the above problems and to obtain by gas-fluidised bed copolymerisation, copolymers of (a) ethylene and/or of 1-butene and (c) at least one alpha-olefin, comprising 5 to 8 carbon atoms, the copolymers having a density comprised between 0.900 and 0.935, and having improved mechanical and optical properties.

The present invention provides a gas fluidised bed process for the production of copolymers having a density comprised between 0.900 and 0.935, this process being characterised in that it comprises a copolymerisation of (a) ethylene, (b) propylene and/or 1-butene and (c) alpha-olefins comprising from 5 to 8 carbon atoms in the gaseous state in admixture with an inert gas and optionally hydrogen, the gaseous mixture circulating from bottom to top through the fluidised bed of the copolymer in course of formation, the copolymerisation being effected at a temperature comprised between 50° C. and 100° C. in the presence of a catalyst system comprising:
on the one hand a cocatalyst consisting of at least one organo metallic compound of a metal of groups II and III of the Periodic Table of Elements,
on the other hand a solid catalyst of the general formula $$Mg_m Me_n Ti(OR_1)_p (R_2)_q X_r D_s$$

in which Me is an aluminium and/or zinc atom, $R_1$ is an alkyl group comprising 2 to 8 carbon atoms, $R_2$ is an alkyl group comprising 2 to 12 carbon atoms, X is a chlorine or bromine atom, D is an electron donor compound, the titanium being in a valency state less than the maimum, where
m is comprised between 1 and 8, preferably between 2 and 5
n is comprised between 0 and 1, preferably between 0 and 0.5,
p is comprised between 0 and 2, preferably between 0.5 and 2
q is comprised between 0.01 and 1, preferably between 0.5 and 0.8,
r is comprised between 2 and 22, preferably between 6 and 12, and
s is less than 0.2, preferably equal to 0;
the partial pressures (pp) of the various ingredients of the gaseous mixture being such that:
0.05 ≦ pp comonomer (b)/pp ethylene ≦ 0.4
0.05 ≦ pp comonomer (c)/pp ethylene ≦ 0.2
0 ≦ pp hydrogen/pp ethylene ≦ 0.5
0.2 ≦ pp inert gas/total pressure ≦ 0.8 and
0.01 Mpa ≦ pp comonomer (c) ≦ 0.1 MPa
the comonomer (b) being propylene or 1-butene or a mixture of these two olefins, the comonomer (c) heing an alpha-olefin comprising 5 to 8 carbon atoms of a mixture of these alpha-olefins.

A catalyst particularly preferred for use in the present invention is prepared by reacting at between −20° C. and 150° C., and preferably between 60° C. and 90° C., magnesium metal with an alkyl halide $R_2X$ and one or more tetravelent titanium compounds having the formula $TiX_{4-t}(OR_1)_t$, wherein $R_1$ is an alkyl group containing 2 to 8 carbon atoms, $R_2$ is an alkyl group containing 2 to 12 carbon atoms, X is chlorine or bromine and t is an integer or fraction from 0 to 3.

In this case the reagents are preferably employed in molar ratios such that:
$0.1 \leq TiX_{4-t}(OR_1)_t/Mg \leq 0.33$
and $0.5 \leq (R_2)X/Mg \leq 8$
and preferably $1.5 \leq (R_2)X/Mg \leq 5$.

Another technique of preparing a solid catalyst suitable for use in the invention consists in reacting an organomagnesium compound and a compound of titanium at its maximum valency. Preferably the solid catalyst in this case is formed from a compound obtained by reacting, at between −20° and 150° C. and more especiallly between 60° and 90° C., one or more compounds of tetravalent titanium, of the formula $TiX_{4-t}(OR_1)_t$ in which X is an atom of chlorine or bromine, $R_1$ is an alkyl group containing 2 to 8 carbon atoms and t is an integer or fraction comprised between 0 and 3, and an organo magnesium compound of the formula $(R_2)MgX$ or the formula $Mg(R_2)_2$ in which X is a chlorine or bromine atom and $R_2$ is an alkyl group comprising 2 to 12 carbon atoms. The reaction between the tetravalent titanium compound or compounds and the organo magnesium compound is advantageously performed in the presence of an alkyl halide of the formula $(R_2)X$ in which $R_2$ and X have the same definitions as above, these various compounds being employed in molar ratios such that:
either
$0.1 \leq TiX_{4-t}(OR_1)_t/(R_2)MgX \leq 0.33$
and $1 \leq (R_2)X/(R_2)MgX \leq 2$
or
$0.1 \leq TiX_{4-t}(OR_1)_t/Mg(R_2)_2 \leq 0.33$
and $2 \leq (R_2)X/Mg(R_2)_2 \leq 4$ Another catalyst suitable for use in the process of the present invention comprises the product obtained by precipitating a titanium compound on particles obtained by reacting an organomagnesium compound and a chlorinated organic compound, complying with the following conditions:
the organomagnesium is either a dialkylmagnesium of the formula $R_3MgR_4$, or an organomagnesium derivative of the formula $R_3MgR_4, xAl(R_5)_3$, in which formula $R_3$, $R_4$, and $R_5$ are identical or different alkyl groups having 2 to 12 carbon atoms and x is a number comprised between 0.01 and 1;
the chlorinated organic compound is an alkyl chloride of the formula $R_6Cl$, in which $R_6$ is a secondary or preferably tertiary alkyl group having 3 to 12 carbon atoms;
the reaction is performed in the presence of an electron donor compound D, which is an organic compound comprising at least one atom of oxygen, sulphur, nitrogen or phosphorus; it may be chosen from amongst a wide variety of products such as the amines, amides, phosphines, sulphoxides, sulphones or the aliphatic ether oxides.

Moreover, the various reagents used for preparing such a support may be employed under the following conditions:
the molar ratio $R_6Cl/R_3MgR_4$ is comprised between 1.5 and 2.5, and preferably between 1.85 and 2;

the molar ratio $R_6Cl/R_3MgR_4$, $xAl(R_5)_3$ is comprised between 1.5 (1+3x/2) and 2.5 (1+3x/2) and preferably between 1.85 (1+3x/2) and 2 (1+3x/2); the molar ratio between the electron donor compound D and the organomagnesium ($R_3MgR_4$ or $R_3MgR_4$, $xAl(R_5)_3$) is comprised between 0.1 and 1;

the reaction between the organomagnesium compound and the chlorinated organic compound takes place with stirring in a liquid hydrocarbon at a temperature comprised between 5° C. and 80° C.

The precipitation of the titanium compound on the solid particles may be carried out by a reduction reaction of a titanium compound of the formula $TiX_{4-t}(OR_1)_t$ in which $R_1$, X and t have the same definitions as above, by means of a reducing agent chosen from among organomagnesium compounds of the formula $R_3MgR_4$, in which $R_3$ and $R_4$ have the same definitions as above, organozinc compounds of the formula $Zn(R_7)_{2-y}X_y$, in which $R_7$ is an alkyl group having 2 to 12 carbon atoms, X is a chlorine or bromine atom and y is an integer or fraction such that $0 \leq y \leq 1$, and organoaluminium compounds of the formula $Al(R_8)_{3-z}X_z$, in which $R_8$ is an alkyl group having 2 to 12 carbon atoms, X is a chlorine or bromine atom and z is an integer or fraction such that $0 \leq z \leq 2$;

the said reduction reaction is performed in the presence or absence of an electron donor compound D as defined above;

the relative quantities of the various compounds (solid particles, titanium compounds, organomagnesium or organozinc or organoaluminium compounds, electron donor) are in molar ratios such that:

magnesium in the solid particles: titanium compound comprised between 1 and 8 and preferably between 2 and 5;

organomagnesium or organozinc or organoaluminium compound: titanium compound less than 2 and preferably comprised between 0.5 and 1.5;

electron donor compound: titanium compound comprised between 0 and 1.

The precipitation is performed at a temperature comprised between −30° C. and 100° C. with stirring in a liquid hydrocarbon medium.

After the evaporation of the liquid hydrocarbon medium in which they have been prepared, the solid catalysts are ready to be used for the copolymerisation of ethylene in the process according to the invention.

The copolymerisation is performed using as cocatalyst an organometallic compound of a metal of groups II or III of the Periodic Table of Elements, preferably an organoaluminium or halogen-organoaluminium compound. The ingredients of the catalyst system must be employed in proportion such that the atomic ratio of the quantity of metal of groups II and III in the cocatalyst to the quantity of titanium in the catalyst is comprised between 0.5 and 100, preferably between 1 and 30.

The catalyst systems are employed as such or preferably after undergoing a prepolymerisation operation. This prepolymerisation operation, which leads to prepolymer particles of a form more or less identical to that of the initial catalyst, but of greater dimensions, consists in bringing the catalyst and cocatalyst into contact with ethylene, possibly in admixture with propylene and/or 1-butene and/or an alpha-olefin containing 5 to to 8 carbon atoms. The prepolymerisation may advantageously be performed in two (or more) stages as described below. The commencement of the prepolymerisation reaction, or the first stage of this reaction when operated in two distinct stages, is performed in suspension in an inert liquid medium such as a liquid hydrocarbon. This technique makes it possible to control the activity of the catalyst system, especially in the initial phase of the reaction, and to avoid reaction runaways or the bursting of catalyst particles.

In the case that the prepolymerisation is carried out in two stages, the first prepolymerisation stage is continued until the prepolymer comprises from 0.1 to 10 g of polyethylene or copolymer of ethylene per milligram atoms of titanium. The prepolymerisation may then be continued either in suspension in a liquid hydrocarbon medium, or in the gas phase; generally speaking it may be continued until 10 to 300 g of polyethylene or copolymer of ethylene per milligram atom of titanium are obtained, whilst preserving a suitable level of activity in the catalyst system.

The prepolymers obtained by this process occur in the form of catalytic products particularly suited to the copolymerisation of (a) ethylene, (b) propylene and/or 1-butene and (c) alpha-olefins comprising from 5 to 8 carbon atoms, in the gas phase by means of a fluidised bed: these prepolymers possess dimensions and a reactivity which are adapted to this mode of copolymerisation, making it possible to obtain copolymers of a homogeneous nature in the form of non-sticking powders, which are free in particular from liquid oligomers or copolymers with a low melting point, and consisting of unburst particles.

The gas-phase copolymerisation by means of a fluidised bed may be performed according to the current techniques of polymerisation or copolymerisation in a fluidised bed. However, the gas mixture providing fluidisstion comprises, in addition to ethylene and the comonomers propylene and/or 1-butene and alpha-olefins comprising 5 to 8 carbon atoms, an inert gas such as nitrogen, methane or ethane and optionally hydrogen, the latter being to provide control of the molecular weights of the copolymers produced. The presence of an inert gas in this gaseous mixture appreciably improves the elimination of the heat of reaction and favourably modifies the kinetics of copolymerisation. The speed of fluidisation in the fluidised bed reactor is preferably sufficiently high to assure homogenisation of the fluidised bed and to eliminate effectively the heat evolved by the copolymerisation without having recourse to other means of homogenisation, especially mechanical or involving the use of a readily volatile liquid. The speed of fluidisation is preferably between 6 and 10 times the minimum speed of fluidisation, that is to say generally between about 40 and 80 cm/sec. In passing throught the fluidised bed, only a part of the ethylene and the comonomers is polymerised in contact with the particles of copolymer in course of growth. The gaseous mixture containing the unreacted fraction of ethylene and comonomers leaves the fluidised bed and passes through cooling system intended to eliminate the heat produced during the reaction before being recycled into the fluidised bed by means of a compressor.

The copolymerisation is performed at a temperature comprised between 50° C. and 100° C., preferably between 70° C. and 90° C. under a total pressure generally between 0.5 and 4 MPa. The copolymerisation is advantageously stopped when the copolymer contains per gram less than $5 \times 10^{-4}$ milligram atoms of titanium and preferably less than $4 \times 10^{-4}$ milligram atoms of titanium.

As comonomer (c), preference is given to 4-methyl-1-pentene, 1hexene or 1-octene.

The invention also concerns copolymers of (a) ethylene, (b) propylene and/or 1-butene and (c) alpha-olefins comprising 5 to 8 carbon atoms, these copolymers:
  having a density comprised between 0.900 and 0.935,
  containing approximately 4 to 15% by weight of the total of the units derived from comonomers (b) and (c), and
  containing units derived from comonomers (b) and (c) in a quantity such that the ratio by weight of the quantity of comonomer (c) to the quantity of comonomer (b) is comprised between 0.1 and 1.5, preferably between 0.25 and 1.

It has surprisingly been found that by a synergic effect, the density of the ethylene copolymers containing the two comonomers (b) and (c) is reduced as compared with that of a copolymer containing only one of these two comonomers, in a quantity by weight equivalent to that of the two comonomers (b) and (c) involved simultaneously. The advantageous result is that a copolymer of a given density prepared according to the invention has a content by weight of comonomers (b) and (c) lower than that of a copolymer of identical density which contains only one of these two comonomers. The synergic effect observed in the simultaneous use of the two comonomers (b) and (c) is particularly remarkable when the copolymer contains these two comonomers in a quantity such that the ratio by weight of the quantity of comonomer (c) to the quantity of comonomer (b) is comprised between 0.1 and 1.5, preferably between 0.25 and 1.

Furthermore, it is found that the copolymers which have a density equal to or greater than 0.918 have a content of copolymers soluble in n-hexane at 50° C. less than or equal to 2.0% by weight, a content which is substantially lower than that of copolymers of ethylene and comonomer (c) of identical density. It has also been found that in the fraction of the copolymers which is soluble in boiling n-hexane, the total content in comonomers (b) and (c) does not exceed the total content in comonmers (b) and (c) of the fraction of the copolymers which is insoluble in boiling n-heptane by more than 15%. This characteristic is shown in detail in the Examples and in Tables 1 and 3.

Due to these characteristics, the copolymers of the invention can be manufactured by fluidised bed copolymerisation without difficulty, thanks particularly to the relatively low partial pressure of the comonomers (c) and to the non-sticky character of the copolymer articles. The non-sticky character of the particles also allows an easy handling of the copolymers.

The density of the copolymers is not limited to values equal to or greater than 0.918, it being possible to obtain without difficulty and with high yield copolymer of a lower density.

Moreover, the copolymer powders prepared according to the invention consist substantially of unburst particles; they are easy to handle and have a relatively high bulk density comprised between 0.30 and 0.45 g/cm$^3$ and which in particular is independent of the yield of copolymer by the reaction in relation to the catalyst. Furthermore, these powders comprise less than 350 ppm, preferably less than 150 ppm of inorganic residues which are totally free from mineral compounds based on refractory oxides of the alumina and/or silica type.

By differential scanning calorimetric analysis, after stoving at 200° C., cooling at a rate of 16° C. per minute, and heating at a rate of 16° C. per minute, the copolymers prepared according to the invention show a single melting point at a temperature comprised between 116° and 128° C., the melting point diagram characteristically showing a single peak at this temperature, which corresponds to a special distribution of the dimensions of the crystallites. The fusion enthalpy of these copolymers corresponds to a crystallinity comprised between about 25 and 50%.

The copolymers of the invention have a flow parameter n comprised between 20 and 40, calculated by the ratio of the melt index ($MI_{21.6}$) measured under 21.6 kg to the melt index ($MI_{2.16}$) measured under 2.16 kg.

The copolymers of the invention also possess a relatively narrow molecular weight distribution, such that the ratio of the weight average molecular weight, Mw, to the number average molecular weight, Mn, determined by gel permeation chromatography, is comprised between 3 and 5.5 and more especially comprised between 4 and 5.

These copolymers are also characterised by a very low level of ethylenic unsaturation of the vinyl, vinylene and vinylidene type, less than 0.2 ethyenic double bond per 1000 atoms of carbon, which confers on these copolymers an excellent stability. Moreover, according to the carbon 13 nuclear magnetic resonance analysis (NMR) the molecular structure of the copolymers of the invention is such that the units derived from comonomers (b) and (c) are distributed randomly along the copolymer chain, at least 95% of these units being isolated from each other, and separated by more than one unit derived from ethylene.

The structure of the copolymers according to the invention is characterised in addition by a very low level of long chain branching (g*) which is expressed by a value $g^* = (\eta)/(\eta_1)$ 0.90, $(\eta)$ being the intrinsic viscosity of a given copolymer and $(\eta_1)$ being the intrinsic viscosity of a linear polyethylene having the same weight average molecular weight as that of the said copolymer.

These copolymers, whose fluidity index measured under 2.16 kg may vary between 0.1 and 30 g per 10 minutes, find numerous applications in the production of finished objects by injection moulding or rotational moulding techniques, or extrusion forming or blowing extrusion techniques, and particularly applications which are of interest in the production of films with a high mechanical strength.

The following non-restrictive Examples illustrate the invention.

EXAMPLE 1

Preparation of the catalyst

Into a 1-liter glass flask, provided with a stirrer system and a heating and cooling device, there are introduced under an atmosphere of nitrogen at 20° C., 500 ml of n-heptane, 8.8 g of magnesium in powder form and 1.2 g of iodine successively. With stirring, the reaction mixture is heated to 80° C. and there are rapidly introduced 9.1 g of titanium tetrachloride and 13.7 g of tetrapropyltitanate, then slowly over 4 hours 74.5 g of n-butyl chloride. At the end of this period the reaction mixture thus obtained is maintained for 2 hours with stirring and at 80° C., then it is cooled to ambient temperature (20° C.). The precipitate obtained is then washed 3 times with n-hexane to give the solid catalyst (A) ready for use. Analysis of the catalyst (A) obtained shows that it contains per gram atom of total titanium:

0.9 gram atom of trivalent titanium,
0.1 gram atom of tetravelent titanium,
3.7 gram atoms of magnesium and
7.7 gram atoms of chlorine and that the composition of the catalyst (A) corresponds to the general formula:

$$Mg_{3.3}Ti(OC_3H_7)_2(C_4H_9)_{0.7}Cl_{7.7}$$

Preparation of the prepolymer

Into a 5-liter stainless steel reactor, provided with a stirrer system rotating at 750 revolutions per minute, there are introduced under nitrogen 3 liters of n-hexane which is heated to 70° C., 25 milliliters of a molar solution of tri-n-octyl aluminium (TnOA) to n-hexane and a quantity of catalyst (A) prepared before hand containing 12.5 milligram atoms of titanium. The reactor is then closed and there are introduced hydrogen up to a pressure of 0.05 MPa and ethylene at a throughput of 160 g/hr for 3 hours. The prepolymer obtained (B) is then dried in a rotating evaporator under vaccuum and preserved under nitrogen. It contains 0.026 milligram atoms of titanium per gram.

Copolymerisation

Into a fluidised bed reactor with a diameter of 90 cm, operating with a rising gas mixture propelled at a speed of 45 cm/sec and under partial pressures (pp) of:

pp hydrogen: 0.051 MPa,
pp ethylene: 0.46 MPa,
pp 1-butene: 0.11 MPa,
pp 4-methyl-1-pentene: 0.028 MPa and
pp nitrogen: 0.96 MPa, at a temperature of 80° C., there are introduced 350 kg of an anhydrous polyethylene powder as the charge powder, then in sequence 96 g of prepolymer (B) every 5 minutes. By sequenced withdrawal, 90 kg per hour of a copolymer powder collected, whilst maintaining constant the height of the fluidised bed. After 12 hours of copolymerisation under these conditions, the charge powder is practically completely eliminated and a copolymer powder (C) is obtained having the following characteristics:

density of the copolymer: 0.918;
content of units derived from the comonomer (b) (1-butene): 5.5% by weight;
content of units derived from comonomer (b) (4-methyl-1-pentene): 2.5% by weight;
melt index ($MI_{2.16}$): 1.0 g/10 minutes;
titanium content: $3.3 \times 10^{-4}$ milligram atoms of titanium per gram;
bulk density: 0.37 g/cm$^3$;
ethylenic unsaturation level: 0.15 ethylenic double bond per 1000 carbon atoms;
melting point: 123° C.;
fusion enthalpy (Delta Hf): 100 J/g;
long branching level (g*): 0.93;
molecular weight distribution (Mw/Mn): 4.0;
content of copolymers soluble in n-hexane at 50° C.: 1.7% by weight.

The values of these characteristics are summarised in Table 1.

On an RCB granulator, granulates are prepared from the copolymer powder (C) by mixing:

98.8% by weight of this polymer,
0.1% by weight of calcium stearate,
0.02% by weight of a phenolic compound sold by Ciba-Geigy under the trade name "Irganox 1076" ®, and
0.08% by weight of an organophosphorus compound sold by Ciba-Geigy under the trade name "Irgafos 168" ®.

These pellets are then converted into a film with a thickness of 35 microns by means of a "Semivex ESY 45" extruder under the following conditions:

air gap on the die: 2.0 mm;
swelling index: 2;
temperature: 225° C.;
throughput: 15 kg/hr The mechanical and optical properties of these films are determined by measuring the tearing and perforation strengths of the said films, and also their transparency and gloss. Results of these measurements are given in Table 2.

EXAMPLE 2

Copolymerisation

This is identical to that of Example 1, except for the fact that instead of using a gas mixture containing 0.051 MPa of hydrogen, 0.46 MPa of ethylene, 0.11 MPa of 1-butene, 0.028 MPa of 4-methyl-1-pentene and 0.96 MPa of nitrogen, a gas mixture is used the various ingredients of which have the following partial pressures (pp):

pp hydrogen: 0.05 MPa,
pp ethylene: 0.50 MPa,
pp 1-butene: 0.096 MPa,
pp 4-methyl-1-pentene: 0.055 MPa and
pp nitrogen: 0.90 MPa.

After 12 hours of copolymerisation, a copolymer powder (D) is obtained the characteristics of which are given in Table 1.

This copolymer powder is converted into pellets, then into films, under conditions identical to those of Example 1, except for the fact that instead of using the powder of copolymer (C), the powder of copolymer (D) is employed. The films this obtained have very good mechanical and optical properties, as is shown by the results of the measurements, given in Table 2.

EXAMPLE 3 (comparative)

Copolymerisation

This is identical to that of Example 1, except for the fact that instead of using a gas mixture containing 0.051 MPa of hydrogen, 0.46 MPa of ethylene, 0.11 MPa of 1-butene, 0.028 MPa of 4-methyl-1-pentene and 0.96 MPa of nitrogen, a gas mixture is used the various ingredients of which have the following pressures (pp).

pp hydrogen: 0.08 MPa,
pp ethylene: 0.46 MPa
pp 1-butene: 0.16 MPa
pp nitrogen: 0.90 MPa.

After 12 hours of copolymerisation, a copolymer powder (E) is obtained the characteristics of which are given in Table 1. An examination of this Table shows in particular that, compared to copolymers (C) and (D) containing ethylene, 1-butene and 4-methyl-1-pentene, copolymer (E) which contains similar total quantities of ethylene and 1-butene, exhibit mechanical and optical properties substantially lower than those of the films obtained from the powders of copolymers (C) and (D), as is shown by the results of measurements given in Table 2.

This copolymer powder is converted into pellets, then into films, under conditions identical to those of Example 1, except for the fact that instead using the powder of copolymer (C), the powder of copolymer (E) is employed. The films thus obtained have considerably poorer mechanical and optical properties than those of the films obtained from the powders of copolymers (C) and (D), as is shown by the results of measurements given in Table 2.

EXAMPLE 4 (comparative)

Copolymerisation

This is identical to that of Example 1, except for the fact that instead of using a gas mixture containing 0.051 MPa of hydrogen, 0.46 MPa of ethylene, 0.11 MPa of 1-butene, 0.028 MPa of 4-methyl-1-pentene and 0.96 MPa of nitrogen, a gas mixture is employed the various ingredients of which have the following partial pressures (pp):

pp hydrogen: 0.11 MPa,
pp ethylene: 0.338 MPa
pp 4-methyl-1-pentene: 0.074 MPa, and
pp nitrogen: 1.078 MPa.

After 12 hours of copolymerisation, a copolymer powder (F) is obtained consisting of relatively sticky particles which are difficult to handle. The characteristics of this powder are given in Table 1. An examination of this table shows in particular that, as compared with copolymers (C) and (D) of ethylene, 1-butene and 4-methyl-1-pentene, the copolymer (F) of ethylene and 4-methyl-1-pentene has for an equivalent density, a substantially higher content by weight of comonomer, and also a distinctly larger content of copolymers soluble in n-hexane at 50° C.

This copolymer powder is converted into pellets, then into films under conditions identical to those of Example 1, except for the fact that instead of using the powder of copolymer (C), the powder of copolymer (F) is employed. The films thus obtained have mechanical properties slightly inferior to those of the films obtained from the powder of copolymers (C) and (D), as is shown by the results of the measurements given in Table 2.

EXAMPLE 5 (comparative)

Copolymerisation

This is identical to that of Example 1, except for the fact that instead of using a gas mixture containing 0.051 MPa of hydrogen, 0.46 MPa of ethylene, 0.11 MPa of 1-butene, 0.028 MPa of 4-methyl-1-pentene and 0.96 MPa of nitrogen, a gas mixture is employed the various ingredients of which have the following partial pressures (pp):

pp hydrogen: 0.04 MPa,
pp ethylene: 0.45 MPa,
pp 1-butene: 0.07 MPa,
pp 4-methyl-1-pentene: 0.08 MPa, and
pp nitrogen: 0.96 MPa.

After 12 hours of copolymerisation a copolymer powder (G) is obtained, which consists of particles having a relatively sticky character and which are difficult to handle. The characteristics of this powder are given in Table 1. This Table shows, in particular, that compared to copolymers (C) and (D), copolymer (G) has a content in 4-methyl-1-pentene substantially higher that its content in 1-butene. The fraction of copolymer (G) which is soluble in n-hexane at 50° C. is also substantially higher than for copolymers (C) and (D).

This copolymer powder is converted into pellets, then into films, under conditions identical to those for Example 1, except for the fact that instead of using the copolymer (C), copolymer powder (G) is employed. The films thus obtained have mechanical and optical properties, which are not as good as those measured on the films obtained from the powders of copolymers (C) and (D), as is shown in Table 2.

EXAMPLE 6

Copolymerisation

This is identical to that of Example 1, except for the fact that instead of using a gas mixture containing 0.051 MPa of hydrogen, 0.46 MPa of ethylene, 0.11 MPa of 1-butene, 0.028 MPa of 4-methyl-1-pentene and 0.96 MPa of nitrogen, a gas mixture is employed the various ingredients of which have the following partial pressures (pp):

pp hydrogen: 0.045 MPa,
pp ethylene: 0.465 MPa,
pp 1-butene: 0.12 MPa,
pp 4-methyl-1-pentene: 0.07 MPa, and
pp nitrogen: 0.90 MPa.

After 12 hours of copolymerisation, a copolymer powder (H) is obtained the characteristics of which are given in Table 3. This copolymer, despite a comparatively low density, occurs in the form of a powder consisting of non-sticky particles, having a low content of copolymers soluble in n-hexane at 50° C.

This copolymer powder is converted into pellets, then into film under conditions identical to those of Example 1, except for the fact that instead of using the copolymer powder (C), the copolymer powder (H) is utilised. The films thus obtained have excellent mechanical and optical properties as is shown by the results of the measurements given in Table 4.

EXAMPLE 7

Copolymerisation

This is identical to that of Example 1, except for the fact that instead of using a gas mixture containing 0.051 MPa of hydrogen, 0.46 MPa of ethylene, 0.11 MPa of 1-butene, 0.028 MPa of 4-methyl-1-pentene and 0.96 MPa of nitrogen, a gas mixture is employed the various ingredients of which have the following partial pressures (pp):

pp hydrogen: 0.09 MPa,
pp ethylene: 0.44 MPa,
pp 1-butene: 0.013 MPa,
pp 4-methyl-1-pentene: 0.04 MPa, and
pp nitrogen: 0.90 MPa.

After 12 hours of copolymerisation a copolymer powder (I) is obtained, the characteristics of which are given in Table 3. An examination of this Table shows in particular that the copolymer (I) has a particularly low density, despite a fairly low content by weight of comonomers.

This comonomer powder is converted into pellets, then into films, under conditions identical to those of Example 1, except for the fact that instead of using the copolymer (C) copolymer powder (I) is employed. The films thus obtained have particularly remarkable mechanical and optical properties, bearing in mind the low density of the copolymer, as shown by the results of the measurements given in Table 4.

EXAMPLE 8

Copolymerisation

This is identical to that of Example 1, except for the fact that instead of using a gas mixture containing 0.051 MPa of hydrogen, 0.46 MPa of ethylene, 0.11 MPa of 1-butene, 0.028 MPa of 4-methyl-1-pentene and 0.96 MPa of nitrogen, a gas mixture is employed the various ingredients of which have the following partial pressures (pp):

pp hydrogen: 0.06 MPa
pp ethylene: 0.49 MPa
pp 1-butene: 0.08 MPa
pp 4-methyl-1-pentene: 0.05 MPa and,
pp nitrogen: 0.92 MPa.

After 12 hours of copolymerisation, a copolymer powder (J) is obtained the characteristics of which are given in Table 3.

This copolymer powder is converted into pellets, then into films, under conditions identical to those of Example 1, except for the fact that instead of using copolymer powder (C), copolymer powder (J) is employed. The films thus obtained have good mechanical and optical properties, as is shown by the results of the measurements given in Table 4.

EXAMPLE 9 (comparative)

Copolymerisation

This is identical to that of Example 1, except for the fact that instead of using a gas mixture containing 0.051 MPa of hydrogen, 0.46 MPa of ethylene, 0.11 MPa of 1-butene, 0.028 MPa of 4-methyl-1-pentene and 0.96 of nitrogen, a gas mixture is employed the various ingredients of which have the following partial pressures (pp):

pp hydrogen: 0.10 MPa
pp ethylene: 0.45 MPa
pp 1-butene: 0.14 MPa
pp nitrogen: 0.91 MPa After 12 hours of copolymerisation a copolymer powder (K) is obtained, the characteristics of which are given in Table 3. An example of this Table shows in particular that, as compared with copolymer (J) of ethylene, 1-butene and 4-methyl-1-pentene, copolymer (K) of ethylene and 1-butene has, for a similar content by weight of comonomer, an identical density.

This copolymer powder is converted into pellets, then into films, under conditions identical to those of Example 1, except for the fact that instead of using copolymer powder (C), copolymer powder (K) is employed. The films thus obtained have relatively lower mechanical and optical properties than those of the films obtained from copolymer powder (K), as is shown by the results of the measurements given in Table 4.

MEASUREMENT OF THE MOLECULAR WEIGHT DISTRIBUTION

The molecular weight distribution of the copolymer is calculated according to the ratio of the weight average molecular weight, Mw, to the number average molecular weight, Mn, of the copolymer, from a distribution curve for the molecular weights obtained by means of a gel permeation chromoatrograph of the "DuPont" Type 860 make (high temperature size exclusion chromatograph), provided with a pump of "DuPont" type 870, the operating conditions being as follows:

solvent: trichloro-1,2,4-benzene
throughput of solvent: 0.8 ml/minute
three columns of the DuPont type with a "Zorbax" packing, the particle of which having a of size 6 microns and a porosity of 60 521 , 1000 Å and 4000 Å respectively
temperaure: 150° C.
concentration of sample: 0.15% by weight
injection volume: 300 ml
detection by infrared, at a wave length of 3.425 microns, by means of a cell 1 mm thick
standardisation by means of a high density polyethylene sold by BP Chimie SA under the trade name "Natene 6055" ®: Mw=70 000 and Mw:Mn=3.8

METHOD FOR DETERMINING THE LEVEL OF LONG BRANCHING, G*

In the formula $g^* = (\eta)/(\eta)_1$, the intrinsic viscosity $(\eta)$ of the copolymer is measured in trichlorobenzene at 135° C. For its part the intrinsic viscosity $(\eta)_1$ of the linear polyethylene having the same weight average molecular weight, Mw, as the said copolymer, is calculated according to the following Mark-Houwink equation: $(\eta)_1$ equals $6.02 \times 10^{-4} \times (Mw)0.69$; the weight average molecular weight, Mw of the copolymer is determined by gel permeation chromatography, the fractionation columns being standardised by means of linear polyethylene.

MEASUREMENT OF THE MELT INDICES $(MI_{2.16})$ AND $(MI_{21.6})$

The melt index $(MI_{2.16}$ is measured under a load of 2.16 kg at 190° C. by the ASTM D-1238 method condition (E).

The melt index $(MI_{21.6})$ is measured under a load of 21.6 kg at 190° C., by the ASTM D-1238 method, condition F.

MEASUREMENT OF THE LIQUID OLIGOMER CONTENT

The liquid oligomer content is the percentage of the weight of the fraction of the copolymers which is dissolved in ethyl ether at 20° C. after 24 hours. The lower limit of the measurement is of 0.05% by weight. The nature of the liquid oligomers is determined by gas chromatography; they generally correspond to hydrocarbons comprising less than 25 carbon atoms.

MEASUREMENT OF THE CONTENT OF COPOLYMERS SOLUBLE IN N-HEXANE AT 50° C.

This measurement corresponds to the method used for FDA standards in the case of polyethylene films for foods stuff packaging. According to this method, a sample of a film having a thickness of 100 micron and the shape of a square of 25×25 mm is dipped in 300 ml of n-hexane at 50° C. and maintained under agitation during 2 hours. The film is then dried and weighed. The content of copolymers soluble in expressed according to the difference in the weights of the film before and after the treatment.

MEASUREMENT OF THE CONTENT OF COPOLYMERS SOLUBLE IN BOILING N-HEXANE

This measurement is made in the same manner as for measuring the content of copolymers soluble in n-hexane at 50° C., except for the n-hexane is maintained at its boiling temperature.

MEASUREMENT OF THE CONTENT OF COPOLYMERS SOLUBLE IN BOILING N-HEPTANE

This measurement is made in the same manner as for measuring the content of copolymers soluble in boiling n-hexane, except that n-heptane is used instead of n-hexane.

MEASUREMENTS ON FILM tearing strengths (in machine direction and transverse direction) measured according to standard ASTM D-1922;

perforation strength, measured according to standard ASTM D-781;

perforation strength ("Dart test") measured according to standard ASTM D-1709;

Transparency (or "Haze") measured according to standard ASTM D-1003;

brillancy ("Gloss") measured according to standard ASTM D-2457.

TABLE 1

| | | | 1 | 2 | 3 (comparative) | 4 (comparative) | 5 (comparative) |
|---|---|---|---|---|---|---|---|
| Density (at 20° C.) | | | 0.918 | 0.918 | 0.919 | 0.918 | 0.918 |
| Content (% by weight of units derived from the comonomers | (b) | | 5.5 | 4.0 | 7.8 | — | 3 |
| | (c) | | 2.5 | 3.8 | — | 11.0 | 6.9 |
| $MI_{2.16}$ (g/10 mins) | | | 1.0 | 0.9 | 1.0 | 1.0 | 1 |
| Content of titanium (mg. at. Ti/g) | | | $3.3 \times 10^{-4}$ | $3.3 \times 10^{-4}$ | $3.8 \times 10^{-4}$ | $4.2 \times 10^{-4}$ | $4.2 \times 10^{-4}$ |
| Bulk density (g/cm$^3$) | | | 0.37 | 0.36 | 0.37 | 0.31 | 0.32 |
| Level of ethylenic unsaturation/1000 carbon atoms | | | 0.15 | 0.17 | 0.14 | 0.18 | 0.17 |
| Melting point (°C.) | | | 123 | 123 | 123 | 124 | 124 |
| Fusion Enthalpy, delta Hf (J/g) | | | 100 | 93.3 | 96.3 | 103 | 101 |
| Long branching level, g* | | | 0.93 | 0.95 | 0.96 | 0.91 | 0.92 |
| Mw/Mn | | | 4.0 | 4.0 | 4.4 | 4.3 | 3.0 |
| Flow parameter, n | | | 25 | 28 | 34 | 32 | 33 |
| Content of copolymers soluble in n-hexane at 50° C. (% by weight) | | | 1.7 | 1.8 | 1.5 | 4.5 | 4.4 |
| Weight content (%) of units derived from comonomers (b) and (c), in the fractions which are: | Soluble in boiling n-hexane | $b_1$ | 9 | 7.9 | 17.0 | — | 6.2 |
| | | $c_1$ | 8.4 | 8.9 | — | 27.0 | 19.0 |
| | Soluble in boiling n-heptane | $b_2$ | 7.2 | 7.2 | 10.9 | — | 4.8 |
| | | $c_2$ | 5.5 | 5.8 | — | 21.0 | 12.0 |
| | Insoluble in boiling n-heptane | $b_3$ | 3.7 | 3.6 | 3.9 | — | 2.5 |
| | | $c_3$ | 2.0 | 3.4 | — | 5.6 | 4.3 |
| Total difference in monomer content | $B = b_1-b_2$ | | 5.3 | 4.3 | 13.1 | — | 3.7 |
| | $C = c_1-c_3$ | | 6.4 | 5.5 | — | 21.4 | 14.7 |
| | $B + C$ | | 11.7 | 9.8 | 13.1 | 21.4 | 18.4 |

TABLE 2

| | | 1 | 2 | 3 (comparative) | 4 (comparative) | 5 (comparative) |
|---|---|---|---|---|---|---|
| Copolymer | | C | D | E | F | G |
| Density (at 20° C.) | | 0.918 | 0.918 | 0.919 | 0.918 | 0.918 |
| Content (% by weight of units derived from the comonomers | (b) | 5.5 | 4.0 | 7.8 | — | 9 |
| | (c) | 2.5 | 3.8 | — | 11.0 | 6.9 |
| Tearing strength according to standard ASTM D 1922 (N) | Machine direction | 3.43 | 3.72 | 1.27 | 2.45 | 2.07 |
| | Transverse direction | 4.90 | 6.47 | 3.92 | >10 | 10 |
| Perforation strength according to standard ASTM D 781 (dJ) | | 21 | 20 | 14 | 16 | 15 |

TABLE 2-continued

| | | Example | | | |
|---|---|---|---|---|---|
| | 1 | 2 | 3 (comparative) | 4 (comparative) | 5 (comparative) |
| Perforation strength according to standard ASTM D 1709 ("Dart Test") (N) | 1.52 | 1.42 | 1.07 | 1.37 | 1.25 |
| Optical Properties Haze | 17 | 14 | 16 | 17 | 17 |
| Gloss | 47 | 46 | 40 | 45 | 43 |

TABLE 3

| | | | Example | | | |
|---|---|---|---|---|---|---|
| | | | 6 | 7 | 8 | 9 (comparative) |
| Density (at 20° C.) | | | 0.914 | 0.915 | 0.922 | 0.922 |
| Content (% by weight of units derived from the comonomers | (b) | | 4.8 | 6.5 | 3.3 | 6.8 |
| | (c) | | 6.2 | 3.5 | 3.6 | — |
| $MI_{2.16}$ (g/10 mins) | | | 1.7 | 0.8 | 1.0 | 0.9 |
| Content of titanium (mg. at. Ti/g) | | | $3.0 \times 10^{-4}$ | $3.5 \times 10^{-4}$ | $3.3 \times 10^{-4}$ | $3.7 \times 10^{-4}$ |
| Bulk Density (g/cm$^3$) | | | 0.32 | 0.33 | 0.38 | 0.37 |
| Level of ethylenic unsaturation/1000 carbon atoms | | | 0.16 | 0.15 | 0.17 | 0.15 |
| Melting point (° C.) | | | 123 | 123 | 123 | 124 |
| Fusion Enthalpy, delta Hf (J/g) | | | 90.4 | 94.2 | 103.0 | 109.7 |
| Long branching level, g* | | | 0.92 | 0.95 | 0.94 | 0.96 |
| Mw/Mn | | | 5.0 | 4.7 | 4.1 | 4.4 |
| Flow parameter, n | | | 35 | 34 | 28 | 32 |
| Content of copolymers soluble in n-hexane at 50° C.(% by weight) | | | 2.5 | 2.4 | 1.4 | 1.2 |
| Weight content (%) of units derived from comonomers (b) and (c), in the fractions which are: | Soluble in boiling n-hexane | $b_1$ | 8.4 | 10.3 | 8.1 | 15.2 |
| | | $c_1$ | 13.1 | 8.1 | 8.8 | — |
| | Soluble in boiling n-heptane | $b_2$ | 7.4 | 8.4 | 6.0 | 10.1 |
| | | $c_2$ | 8.1 | 5.3 | 5.5 | — |
| | Insoluble in boiling n-heptane | $b_3$ | 3.9 | 3.8 | 2.9 | 3.2 |
| | | $c_3$ | 3.8 | 3.3 | 3.3 | — |
| Total difference in monomer content | $B = b_1-b_2$ | | 4.5 | 6.5 | 5.2 | 12.0 |
| | $C = c_1-c_3$ | | 9.4 | 4.8 | 5.5 | — |
| | $B + C$ | | 13.9 | 11.3 | 10.7 | 12.0 |

TABLE 4

| | | Example | | | |
|---|---|---|---|---|---|
| | | 6 | 7 | 8 | 9 (comparative) |
| Copolymer | | H | I | J | K |
| Density (at 20° C.) | | 0.914 | 0.915 | 0.922 | 0.922 |
| Content (% by weight) of units derived from the comonomers | (b) | 4.8 | 6.5 | 3.3 | 6.8 |
| | (c) | 6.2 | 3.5 | 3.6 | — |
| Tearing strength according to standard ASTM D 1922 (N) | Machine direction | >5 | 4.90 | 1.56 | 0.88 |
| | Transverse direction | >5 | 7.15 | 5.39 | 3.92 |
| Perforation strength according to standard ASTM D 781 (dJ) | | 24 | 23 | 15 | 11 |
| Perforation strength according to standard ASTM D 1709 ("Dart Test") (N) | | 2.05 | 2.01 | 1.17 | 0.58 |
| Optical Properties Haze | | 13 | 16 | 19 | 20 |
| Gloss | | 50 | 47 | 42 | 40 |

We claim:

1. A gas fluidised bed process for the production of copolymers having a density comprised between 0.900 and 0.935, this process being characterised in that it comprises a copolymerisation of (a) ethylene, (b) propylene and/or 1-butene, and (c) alpha-olefins comprising 5 to 8 carbon atoms in the gaseous state in admixture with an inert gas and optionally hydrogen, the gas mixture circulating from bottom to top through the fluidised bed of the copolymer in course of formation, the copolymerisation being effected at a temperature comprised between 50° C. and 100° C. under a total pressure comprised between 0.5 to 4 MPa with a speed of fluidisation from 40 to 80 cm/sec in the presence of a catalyst system comprising:

a solid catalyst prepared by reacting at between $-20°$ C. and 150° C. magnesium metal with an alkyl halide $R_2X$ and one or more tetravalent titanium compounds having the formula $TiX_{4-t}(OR_1)_t$, wherein $R_1$ is an alkyl group containing 2 to 8 carbon atoms, $R_2$ is an alkyl group containing 2 to 12 carbon atoms, X is chlorine or bromine and t is an integer or fraction from 0 to 3; in molar ratios such that:

$0.1 \leq TiX_{4-t}(OR_1)_t/Mg \leq 0.33$
and $0.5 \leq (R_2X)/Mg \leq 8$ and, a cocatalyst consisting of at least one organoaluminium or halogen-organoaluminium compound in a quantity such that the atomic ratio of the quantity of aluminium to the quantity of titanium is comprised between 1 and 30, the partial pressure (pp) of the various ingredients of the gas mixture being such that:

$0.05 \leq$ pp comonomer (b)/pp ethylene $\leq 0.4$
$0.05 \leq$ pp comonomer (c)/pp ethylene $\leq 0.2$
$0 \leq$ pp hydrogen/pp ethylene $\leq 0.5$
$0.2 \leq$ pp inert gas/total pressure $\leq 0.8$, and
0.01 MPa $\leq$ pp comonomer (c) $\leq 0.1$ MPa and such that the ratio by weight of the quantity of comonomer (c) to the quantity of comonomer (b) fixed in the copolymer is comprised between 0.1 and 1.5, comonomer (b) being propylene or 1-butene or a mixture of these two olefins, comonomer (c) being an alpha-olefin comprising 5 to 8 carbon atoms or a mixture of these alpha olefins, further characterised in that before performing in said copolymerisation, the catalyst system is subjected to prepolymerisation during which the catalyst and cocatalyst are brought into contact with ethylene, so as to obtain from 0.1 to 300 g of polyethylene or copolymer of ethylene per milligramme atom of titanium.

2. Process in accordance with claim 1, characterised in that the solid catalyst is obtained by reacting at between 60° C. and 90° C., magnesium metal with an alkyl halide $R_2X$ and one or more tetravalent titanium compounds having the formula $TiX_{4-t}(OR_1)_t$ wherein t is an integer or a fraction from 0 to 3.

3. Process in accordance with claim 1, characterised in that the commencement of prepolymerisation is carried out in suspension in a liquid hydrocarbon medium.

4. Process in accordance with claim 1, characterised in that the prepolymerisation is carried out in two stages, the first stage being performed in suspension in a liquid hydrocarbon medium, so as to obtain from 0.1 to 10 g of polymer or copolymer per milligramme atom of titanium, the second stage being performed either in suspension in a liquid hydrocarbon medium or in the gas phase.

5. A novel copolymer of (a) ethylene, comonomer (b) being propylene or 1-butene or a mixture of these two olefins, and comonomer (c) being an alpha olefin comprising 5 to 8 carbon atoms or a mixture of these alpha olefins, said copolymer being produced by a gas fluidised bed process comprising copolymerising said comonomers (a), (b) and (c), in the gaseous state in admixture with an inert gas and optionally hydrogen, the gas mixture circulating from bottom to top through the fluidised bed of the copolymer in course of formation, the copolymerisation being effected at a temperature comprised between 50° C. and 100° C. under a total pressure comprised between 0.5 to 4 MPa with a speed of fluidisation from 40 to 80 cm/sec in the presence of a catalyst system comprising:

a solid catalyst prepared by reacting at between $-20°$ C. and 150° C. magnesium metal with an alkyl halide $R_2$ and one or more tetravalent titanium compounds having the formula $TiX_{4-t}(OR_1)_{t1}$, wherein $R_1$ is an alkyl group containing 2 to 8 carbon atoms, $R_2$ is an alkyl group containing 2 to 12 carbon atoms, X is chlorine or bromine and t is an integer or fraction from 0 to 3, in molar ratios such that:

$0.1 \leq TiX_{4-t}(OR_1)_t/Mg \leq 0.33$
and $0.5 \leq (R_2)X/Mg \leq 8$ and a cocatalyst consisting of at least one organoaluminium compound in a quantity such that the atomic ratio of the quantity of aluminium to the quantity of titanium is comprised between 1 and 30, the partial pressure (pp) of the various ingredients of the gas mixture being such that $0.05 \leq$ pp comonomer (b)/pp ethylene $\leq 0.4$
$0.05 \leq$ pp comonomer (c)/pp ethylene $\leq 0.2$
$0 \leq$ pp hydrogen/pp ethylene $\leq 0.5$
$0.2 \leq$ pp inert gas/total pressure $\leq 0.8$, and
0.01 MPa $\leq$ pp comonomer (c)/0.1 MPa comonomer (b) and comonomer (c) being defined above, further characterised in that before performing the said copolymerisation, the catalyst system is subjected to prepolymerisation during which the catalyst and cocatalyst are brought into contact with ethylene, so as to obtain from 0.1 to 300 g of polymer of copolymer per milligramme atom of titanium, said copolymer being characterised in that it has:

(i) a density comprised between 0.900 and 0.935,
(ii) a total content of units derived from comonomers (b) and (c) comprised between 4 and 15% by weight
(iii) contents of units derived from comonomers (b) and (c) such that the ratio by weight of the quantity of comonomer (c) to the quantity of comonomer (b) is comprised between 0.1 and 1.5,
(iv) a melt index ($MI_{2.16}$) measured under 2.16 kg, comprised between 0.1 and 30 g/10 minutes,
(v) a flow parameter comprised between 20 and 40, calculated by the ratio of the melt index ($MI_{21.6}$) measured under 21.6 kg to the melt index ($MI_{2.16}$) measured under 2.16 kg,
(vi) a content of copolymers soluble in n-hexane at 50° C. less than or equal to 2.0% by weight, when the copolymer has a density equal to or greater than 0.918,
(vii) a total content of comonomers (b) and (c) present in the fraction of the copolymers which is soluble in boiling n-hexane which does not exceed by more than 15% the total content in comonomers (b) and (c) present in the fraction of the copolymer which is insoluble in boiling n-heptane,
(viii) an ethylenic unsaturation level of the vinyl, vinylene, and vinylidene type of less than 0.2 ethylenic double bond per 1000 carbon atoms,
(ix) a single melting point comprised between 116° and 128° C., determined by scanning differential calorimetric analysis after stoving at 200° C., cooling at a speed of 16° per minute and heating at a speed of 16° C. per minute, (x) a structure with a low level of long chain branchings, such that $g^* \leqq 0.90$, $g^* = (\eta):(\eta_1)$, $(\eta)$ being the intrinsic viscosity of the copolymer and $(\eta_1)$ being the intrinsic viscosity of a linear polyethylene having the same weight average molecular weight as that of the said copolymer, (k) the copolymer contains per gram less than $5 \times 10^{-4}$ milligram atoms or titanium, (l) the bulk density is between 0.30 and 0.45 g/cm$^3$ and (m) the copolymer contains less than 350 ppm inorganic residues.

6. A novel copolymer according to claim 5, characterised in that its molecular structure, determined by carbon 13 nuclear magnetic resonance (NMR) is such that the units derived from comonomers (b) and (c) are distributed along the copolymer chain, at least 95% of these units being completely isolated from each other, separated by more than one unit derived from ethylene.

7. A process for the production of a finished object comprising producing said object by injection moulding the copolymer according to claim 5.

8. A process for the production of a finished object comprising producing said object by rotational moulding the copolymer according to claim 5.

9. A process for the production of a finished object comprising producing said object by extrusion forming the copolymer according to claim 5.

10. A process for the production of a finished object comprising producing said object by blowing extrusion of the copolymer according to claim 5.

11. The copolymer of claim 5, wherein in (c), the weight ratio of comonomer (c) to comonomer (b) is between 0.25 and 1.

* * * * *

UNITED STATES PATENT AND TRADEMARK OFFICE
CERTIFICATE OF CORRECTION

PATENT NO. : 4,857,611

DATED : August 15, 1989

INVENTOR(S) : Daniel C. Durand, et al.

It is certified that error appears in the above-identified patent and that said Letters Patent is hereby corrected as shown below:

Col. 1, line 36, "such as 1hexane" should read --such as 1-hexane--

Col. 2, line 58, "so that copolymer" should read -- so that the compolymer--

Col. 3, line 44, correct the spelling of the word "maximum".

Col. 3, line 64, correct the spelling of the word "being".

Col. 6, lines 37-38, correct the spelling of the word "fluidisation".

Col. 7, line 6, "1hexene on" should read --1-hexene or --.

Col. 8, line 28, correct the spelling of the word "ethylenic"

Col. 14, line 8, "porosity of 60 521" should read --porosity of 60 Å--

Claim 1, line 22, "3;" should be --3, --

Claim 5, col. 21, line 12, change "or" to --of --.

Signed and Sealed this

Fourteenth Day of August, 1990

Attest:

HARRY F. MANBECK, JR.

*Attesting Officer*     *Commissioner of Patents and Trademarks*